United States Patent
Morgan et al.

(10) Patent No.: US 10,764,164 B2
(45) Date of Patent: *Sep. 1, 2020

(54) GRAPH NODE WITH AUTOMATICALLY ADJUSTING INPUT PORTS

(71) Applicant: MICROSOFT TECHNOLOGY LICENSING, LLC, Redmond, WA (US)

(72) Inventors: Peter Morgan, Natick, MA (US); Harminder Singh, Reading, MA (US); Damon Robert Hackmeister, North Granton, MA (US); Anthony Christopher Karloff, Watertown, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,239

(22) Filed: Feb. 14, 2019

(65) Prior Publication Data

US 2019/0182131 A1 Jun. 13, 2019

Related U.S. Application Data

(63) Continuation of application No. 14/944,005, filed on Nov. 17, 2015, now Pat. No. 10,212,056.

(51) Int. Cl.
*H04L 12/26* (2006.01)
*G06F 8/34* (2018.01)
(Continued)

(52) U.S. Cl.
CPC ........ *H04L 43/045* (2013.01); *G06F 3/04847* (2013.01); *G06F 8/34* (2013.01); *G06T 11/206* (2013.01); *G06T 2200/24* (2013.01)

(58) Field of Classification Search
CPC ...... G06F 3/04847; G06F 8/34; G06T 11/206; G06T 2200/24; H04L 43/045
See application file for complete search history.

(56) References Cited

U.S. PATENT DOCUMENTS

| | | | | |
|---|---|---|---|---|
| 5,999,729 A | * | 12/1999 | Tabloski, Jr. ............. | G06F 8/34 717/105 |
| 2003/0130821 A1 | * | 7/2003 | Anslow .................. | H04L 41/12 702/186 |

(Continued)

OTHER PUBLICATIONS

"Summons to Attend Oral Proceedings Issued in European Patent Application No. 16802217.6", dated Mar. 18, 2019, 8 Pages. (MS# 358567-EP-EPT).

*Primary Examiner* — Andrea N Long
(74) *Attorney, Agent, or Firm* — Workman Nydegger

(57) ABSTRACT

A graphical user interface system that visually represents a graph node having multiple input ports, and that automatically adjusts the number of input ports to the graph node as open input ports are connected to upstream graph node(s) and/or as used input ports are disconnected from upstream graph node(s). Upon detecting that a set of one or more input ports has just been connected to one or more upstream graph nodes, the system may automatically add one or more additional input ports to the visual representation of the graph node without explicit user instruction. Upon detecting that a set of one or more of the input ports has just been disconnected from one or more upstream graph nodes, the system may automatically remove the determined one or more input ports from the visual representation of the graph node.

20 Claims, 10 Drawing Sheets

(51) Int. Cl.
    *G06F 3/0484*     (2013.01)
    *G06T 11/20*     (2006.01)

(56) References Cited

U.S. PATENT DOCUMENTS

| | | | |
|---|---|---|---|
| 2012/0102029 A1* | 4/2012 | Larson | G06F 8/34 |
| | | | 707/736 |
| 2012/0227047 A1* | 9/2012 | Aharoni | G06F 9/50 |
| | | | 718/102 |
| 2015/0058772 A1* | 2/2015 | Bator | G06T 11/206 |
| | | | 715/769 |
| 2017/0141976 A1* | 5/2017 | Morgan | G06F 8/34 |

\* cited by examiner

GRAPH NODE WITH AUTOMATICALLY ADJUSTING INPUT PORTS

CROSS-REFERENCE TO RELATED APPLICATIONS

This application is a continuation of U.S. patent application Ser. No. 14/944,005 filed on Nov. 17, 2015, entitled "GRAPH NODE WITH AUTOMATICALLY ADJUSTING INPUT PORTS," which application is expressly incorporated herein by reference in its entirety.

BACKGROUND

Computing systems and associated networks have revolutionized the way human beings work, play, and communicate. Nearly every aspect of our lives is affected in some way by computing systems. Of course, proper functioning of a computing system relies on software that provides the appropriate function, and data that provides appropriate input and configuration for the software. Furthermore, it is important that execution of software respect dependencies between components of that software. Given how complex software has now become, and given the mass quantities of data available for processing, such construction can be a difficult task.

Nodal graphs are one mechanism that visualizes the process in a much more intuitive way for a user. Furthermore, rather than simply visualization, the building of nodal graphs actually constructs the corresponding software. Nodal graphs are constructed from graph nodes that each represent executable components of the software. Furthermore, input ports of a given graph node may be coupled to upstream graph nodes so as to represent dependency from that upstream data node and/or data flow from that upstream data node. Typically, a user may simply gesture that an output port of an upstream graph node is to be coupled to an input port of a downstream graph node. This would enforce a dependency at runtime if the coupling represented a dependency, or cause data to flow at runtime if the coupling represents a data flow.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a graphical user interface system that visually represents a graph node having multiple input ports, and that automatically adjusts the number of input ports to the graph node as open input ports are connected to upstream graph node(s) and/or as used input ports are disconnected from upstream graph node(s). For instance, upon detecting that a set of one or more input ports has just been connected to one or more upstream graph nodes, the system may automatically add one or more additional input ports to the visual representation of the graph node without explicit user instruction. Alternatively or in addition, upon detecting that a set of one or more of the input ports has just been disconnected from one or more upstream graph nodes, the system may automatically remove the determined one or more input ports from the visual representation of the graph node.

Accordingly, the principles described herein provide a mechanism in which the building of a nodal graph is more automated, or at least the user is relieved from having to think about exhausting or consolidating input ports as the user constructs or edits the graph. Instead, the user or process may focus on the important tasks involved with construction of graphs. This may prove key as nodal graphs can become quite complicated, and distractions from the core concepts of the nodal graph can result in errors in construction itself. Furthermore, each input port retains a spatial order with respect to the graph node. Such ordering can be important as the logic associated with the graph node may depend on, or have improved functioning when, such order of processing of inputs being preserved.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to a graphical user interface system that visually represents a graph node having multiple input ports, and that automatically adjusts the number of input ports to the graph node as open input ports are connected to upstream graph node(s) and/or as used input ports are disconnected from upstream graph node(s). For instance, upon detecting that a set of one or more input ports has just been connected to one or more upstream graph nodes, the system may automatically add one or more additional input ports to the visual representation of the graph node without explicit user instruction. Alternatively or in addition, upon detecting that a set of one or more of the input ports has just been disconnected from one or more upstream graph nodes, the system may automatically remove the determined one or more input ports from the visual representation of the graph node.

Accordingly, the principles described herein provide a mechanism in which the building of a nodal graph is more automated, or at least the user is relieved from having to think about exhausting or consolidating input ports as the user constructs or edits the graph. Instead, the user or process may focus on the important tasks involved with construction of graphs. This may prove key as nodal graphs can become quite complicated, and distractions from the core concepts of the nodal graph can result in errors in construction itself. Furthermore, each input port retains a spatial order with respect to the graph node. Such ordering can be important as the logic associated with the graph node may depend on, or have improved functioning when, such order of processing of inputs being preserved.

Some introductory discussion of a computing system will be described with respect to FIG. 1. Then, the structure and operation of the graphical user interface system will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
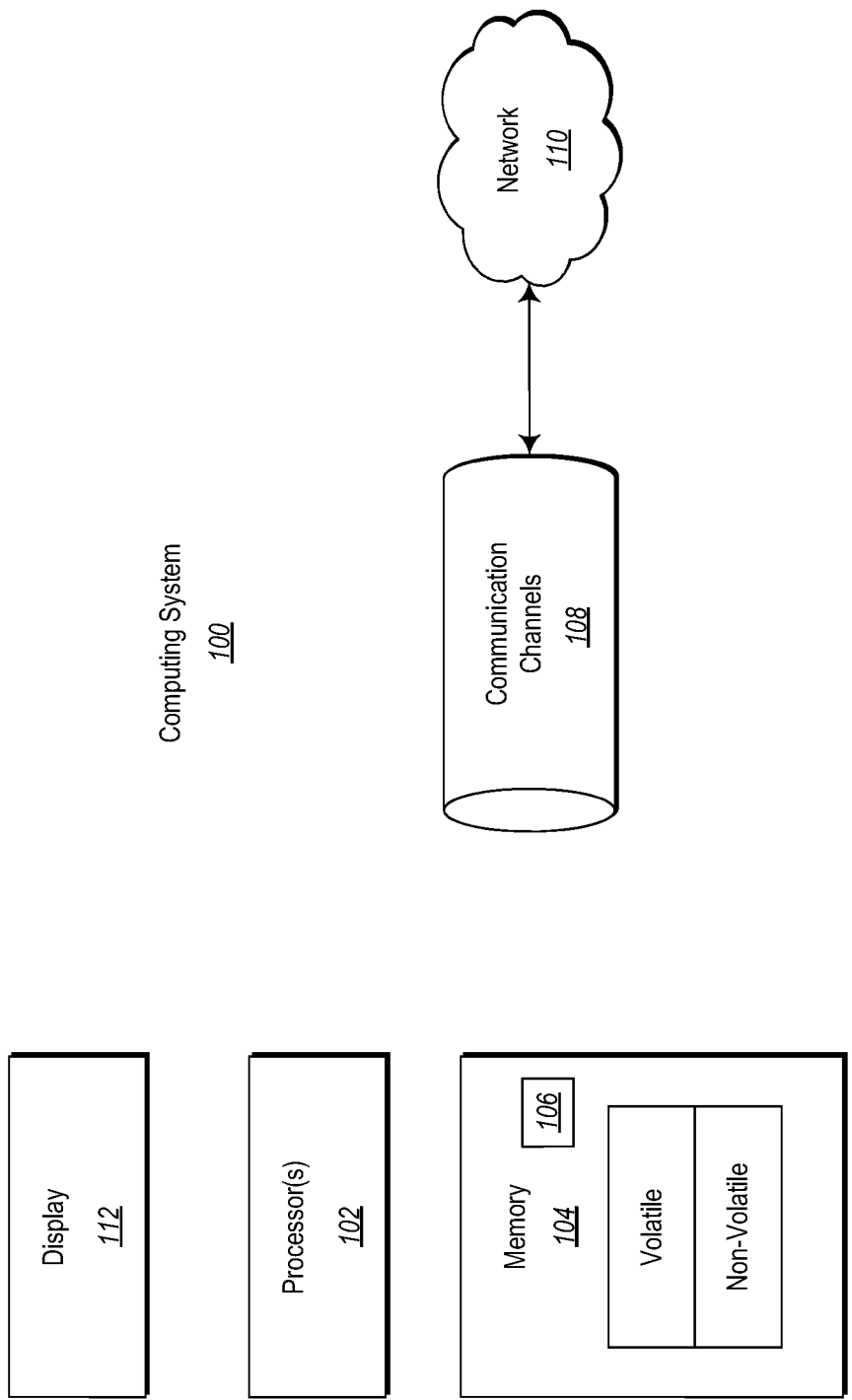
FIG. 1 abstractly illustrates a computing system in which some embodiments described herein may be employed, and which has thereon an executable component.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module" or the like may also be used. As used in this description and in the case, these terms are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 may also include a display 112, which may be used to display visual representations (such as graphical user interfaces showing graphs) to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
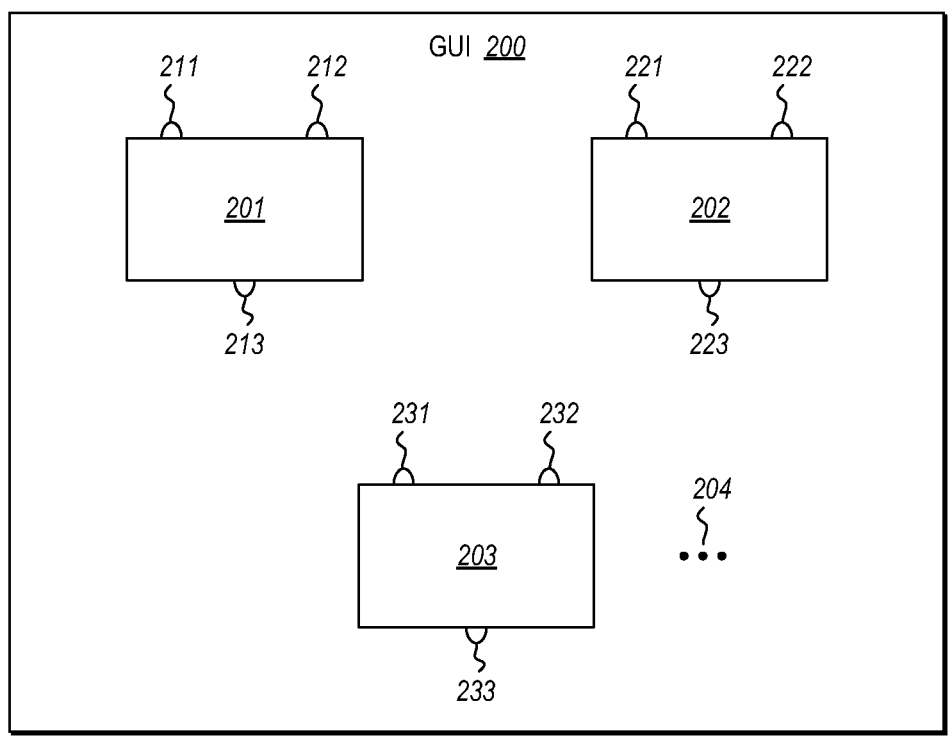
FIG. 2 illustrates an example graphical user interface that includes multiple disconnected graph nodes, each with two input ports and an output port.

As previously mentioned, the principles described herein relate to the efficient construction of a nodal graph in which each graph node represents processing, and the coupling of two graph nodes represents a dependency or data flow between the graph nodes. As an example, only, FIG. 2 illustrates an example graphical user interface 200 that includes graph nodes 201, 202 and 203. The graphical user interface 200 may be displayed on, for instance, the display 112 of the computing system 100 of FIG. 1.

Although there are three graph nodes 201 through 203 illustrated in FIG. 2, the principles described herein apply to the construction of any graph, regardless of how complex. Accordingly, ellipses 204 represents flexibility in the number of graph nodes that can be represented within the graphically user interface. There may be from as few as one graph node in a trivial case, to enumerable numbers of graph nodes within any graph represented in the graphical user interface 200.

In the state of FIG. 2, the graph nodes are shown as disconnected from each other. However, each graph node has one or more input ports and one or more output ports. In order to construct a software program, the author designates connections between one or more output ports of one or more upstream graph nodes and one or more input ports of one or more downstream graph nodes. Those connections enforce dependencies in the execution of the code corresponding to the graph nodes and/or represent the flow of data from upstream to downstream graph nodes. Thus, an author may use the graphical user interface 200 to select appropriate graph nodes with appropriate code, and strategically establish connections between those graph nodes to thereby construct complex software having various contributing executable components.

In the example of FIG. 2, the graph node 201 is illustrated as including two input ports 211 and 212 and an output port 213. Also, graph node 202 is illustrated as including two input ports 221 and 222 and output port 223. Finally, graph node 203 is illustrated as include two input ports 231 and 232 and output port 233. The principles described herein do not depend on a default starting number of input ports and output ports. In the case of there being an established connection, the author may also select input ports to see metadata (e.g., an identification) regarding the data flow into that port, or may select output ports to see metadata (e.g., an identification) of the data flow out of that port. If the connection represents a dependency, metadata regarding that dependency might also be viewed by selecting an appropriate input port or output port.

Regardless of what the starting number of input ports, the principles described herein are automatically added and/or removed as connections are made. For instance, at appropriate times, new input ports may be automatically added to a graph node as the available input ports to use for connections approaches depletion or becomes depleted (e.g., due to connection of input ports with the output ports of upstream graph node(s)). Alternatively, and preferably in addition, at appropriate times, extra input ports are also automatically removed from a graph node as extra input ports become available (e.g., due to disconnection of input ports from upstream graph node(s)). Thus, the number of input ports adjusts automatically without the user having to pay attention to the precise number of input ports. Rather, the user may focus on other more strategic and important aspects of graph construction.

Figure 3:
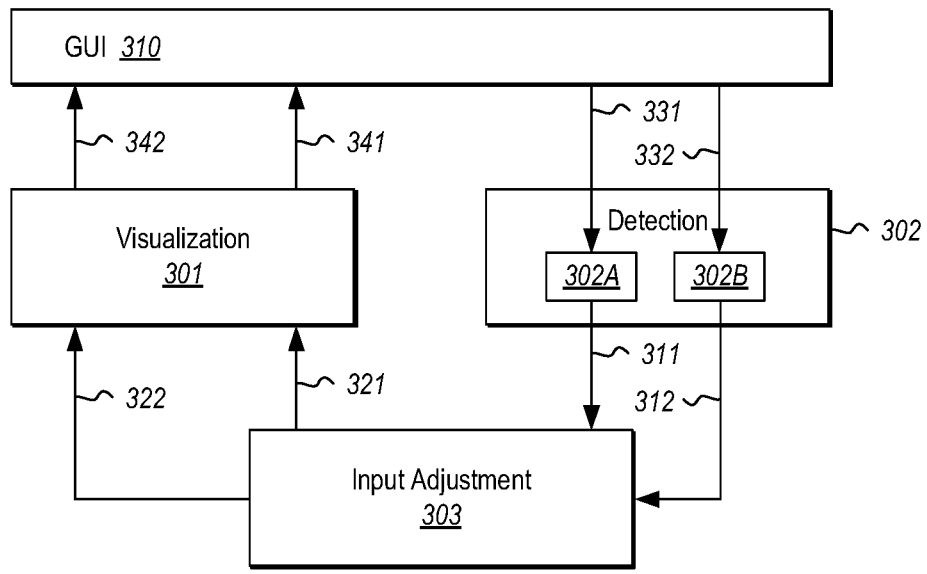
FIG. 3 illustrates an architecture of executable components that may be used in order to present a graph of graph nodes within a graphical user interface such as the graphical user interface of FIG. 2.

FIG. 3 illustrates an architecture 300 of executable components that may be used in order to present a graph of graph nodes within a graphical user interface. For instance, the architecture 300 may be used to present the graphical user interface 200 of FIG. 2.

The architecture 300 includes a graph node visualization component 301 that visualizes graph nodes within a graphical user interface 310 (e.g., which is an example of the graphical user interface 200). There may, but need not, be one graph node visualization module 301 for rendering each graph node within that graph that is rendered on the graph user interface. The graph node visualization module 301 also displays a number of input ports and output ports associated with each graph node.

The architecture 300 also includes a detection component 302. The detection component 302 includes a component 302A that detects an event (as represented by arrow 331) when a new connection is made between an input port of a graph node and an output port of one or more upstream graph nodes within the graphical user interface 310. The detection component 302 also includes another component 302B that detects an event (as represented by arrow 332) when a disconnection is made between an input port of a graph node and an output port of an upstream graph node in the graphical user interface 310.

The architecture 300 also includes a port adjustment component 303. There may be a port adjustment component 303 for each graph node, or the port adjustment component 303 may automatically adjust the input ports for any number of graph nodes. If the adjustment component 303 receives a notification (e.g., as represented by arrow 311) from the component 302A that a new connection has been made from an input port of graph node that the port adjustment component 303 serves, the port adjustment component 303 will determine whether one or more additional input ports should be added to the graph node. If so, the port adjustment component 303 signals (as represented by arrow 321) the graph node visualization component 301 that is responsible for visualizing that graph node to appropriately add the additional input port(s) to that graph node. This causes (as represented by arrow 341) the addition of the additional input node(s) to the appropriate graph node in the graphical user interface 310.

On the other hand, if the port adjustment component 303 receives a notification (e.g., as represented by arrow 312) from the component 302B that a disconnection has been made from an input port of a graph node that the port adjustment component 303 serves, the port adjustment component 303 will determine whether one or more extra input ports should be removed from the graph node. If so, the port adjustment component 303 will signal (as represented by arrow 322) the graph node visualization component 301 that is responsible for visualizing that graph node to appropriately remove the extra input port(s) from that graph node. This causes (as represented by arrow 342) the removal of the extra input port(s) from the appropriate graph node in the graphical user interface 310.

Each of the graph node visualization component 301, the detection component 302, the component 302A, the component 302B and the port adjustment component 303 are examples of the executable component 106 of FIG. 1. Thus, each of such components may have any of the structures described above as associated with an executable component.

Figure 4:
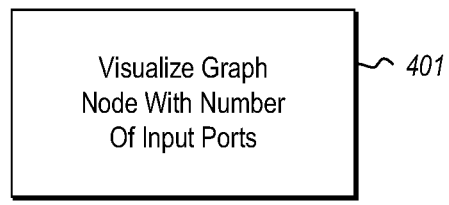
FIG. 4 illustrates a flowchart of a method for visually representing a graph node having a plurality of input ports.

FIG. 4 illustrates a flowchart of a method 400 for visually representing a graph node having a plurality of input ports. The method 400 includes representing the graph node on a display as having a number of input ports (act 401). For instance, this act may be performed by the graph node visualization component 301 of FIG. 3. As an example, the graph node might be, for instance, the graph node 203 of the graphical user interface 200 of FIG. 2.

While the graph node is being visually represented (e.g., in act 401) by the graph node visualization component, the port adjustment component 303 may respond to two different types of events. One event (e.g., event 311 of FIG. 3)) is that the port adjustment component detects that a set of one or more of the input ports has just been connected to one or more upstream graph nodes. This event, and the response thereto, is represented by the method 500 of FIG. 5, and includes an example process of graph node manipulation with respect to FIGS. 6A through 6F. Another event (e.g., event 312 of FIG. 3) is that the port adjustment component detects that a set of one or more of the input ports has just been disconnected from one or more upstream nodes. This event, and the response thereto, is represented by the method 700 of FIG. 7, and includes an example process of graph node manipulation with respect to FIGS. 8A through 8G.

Figure 5:
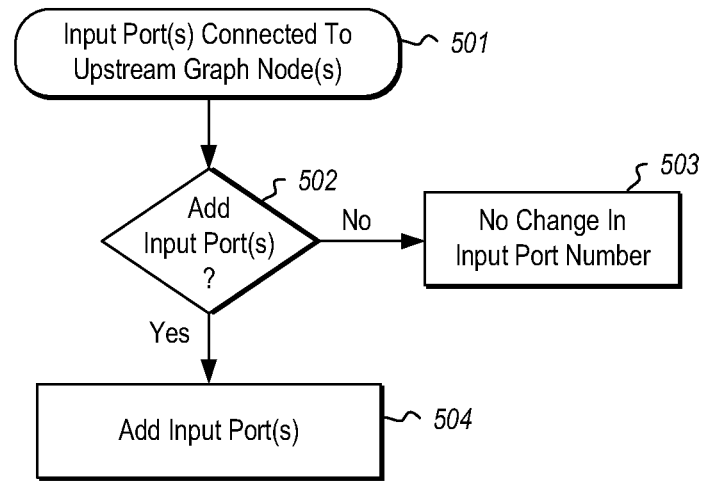
FIG. 5 illustrates a flowchart of a method for adding additional input ports to the graph node in response to detecting the usage of input ports of the graph node in accordance with the principles described herein.

According, to FIG. 5, the method 500 is initiated upon detecting that a set of one or more input ports has just be connected to one or more upstream graph nodes (act 501). For instance, in FIG. 3, the component 302A notifies (as represented by arrow 311) the port adjustment component 303 of this connection. In response, the port adjustment component 303 applies its automated logic to determine whether or not an additional one or more input ports is to be added to the graph node (decision block 502). If not ("No" in decision block 502), then no action need be taken in response to the detection (act 503).

On the other hand, if the port adjustment component determines to respond to the detection (act 501) by adding one or more input ports to the graph node ("Yes" in decision block 502), the port adjustment component causes the one or more additional input ports to be added to the graph node (act 503). For instance, the port adjustment component 303 may signal (as represented by arrow 321) the graph node visualization module 301 to thereby cause (as represented by arrow 341) the graph node visualization module 301 to visualize the additional input ports on the graph node within the graphical user interface 310. From the user's perspective, the user used one or more of the input ports, and the graph node automatically added more input ports for potential use by the user. Accordingly, at least one input port is made available no matter how many input ports already exist and are in use. The user thus does not need to worry about creating input ports, or providing guidance as to how many input ports are needed.

FIG. 6A through 6F illustrates a graph node in several incremental stages in which input ports are automatically added. In these examples, the graph node has a default minimum number of input ports of two input ports, and a default maximum number of input ports at six. The minimum and maximum number may be configurable and perhaps in some cases there may be no maximum at all.

Furthermore, the illustrated example illustrates only a single kind of input port. The determination of whether or not to add input port(s) to the graph node may be made on a per input port type basis. For instance, one input port type might receive string data, and another input port type might receive integers. In that case, the input port might have some visualization (such as color, shape, size, and so forth) so that the user can match up input ports of the graph node with appropriate output ports of potential upstream graph nodes. In such a case, the connection of a particular type of input port with an upstream graph node may have no effect whatsoever on whether or not input ports of any other type should be added. There can also be more than one instance of a particular type. For example, in the function foo(string str1, int int1, string str2), str1 and str2 might have completely different meanings, and each can be expanded to accept a variable number of input ports (but the incoming data to the module will be handled differently between the two sets of inputs).

Figure 6A:
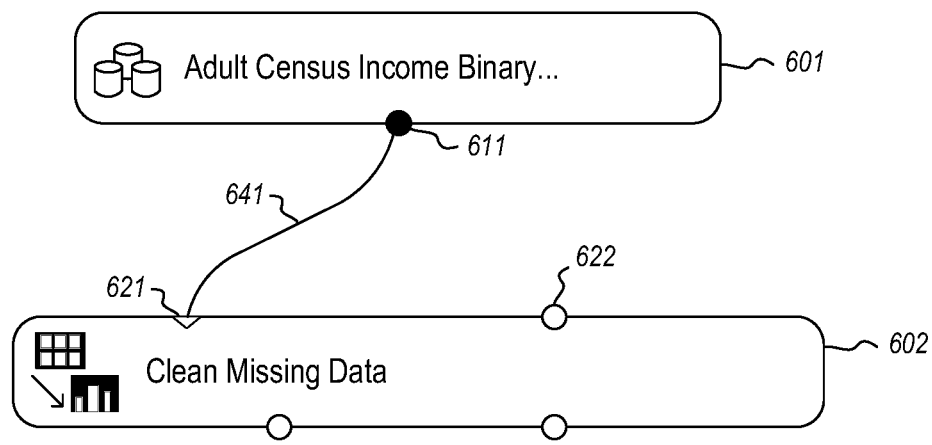
FIGS. 6A through 6F illustrate various stages of a graph node in which multiple input ports are added in response to multiple performances of the method of FIG. 5.

The graph node state of this example manipulation first begins in the state of FIG. 6A. In this state, there is an upstream graph node 601 and a downstream graph node 602, and an input port 621 of the graph node 602 has been connected to the output port 611 of the upstream graph node 601 as represented by connection 641. There is one further available input port 622 on the graph node 602. In this example, the connection 641 represents a data flow. The upstream graph node 601 provides data in the form of adult census income binary data. The downstream graph node 602 takes in such data and cleans missing data. Of course, the exact function of the graph nodes 601 and 602 is not important to the broader principles describe herein, and is merely provided as an example.

Figure 6B:
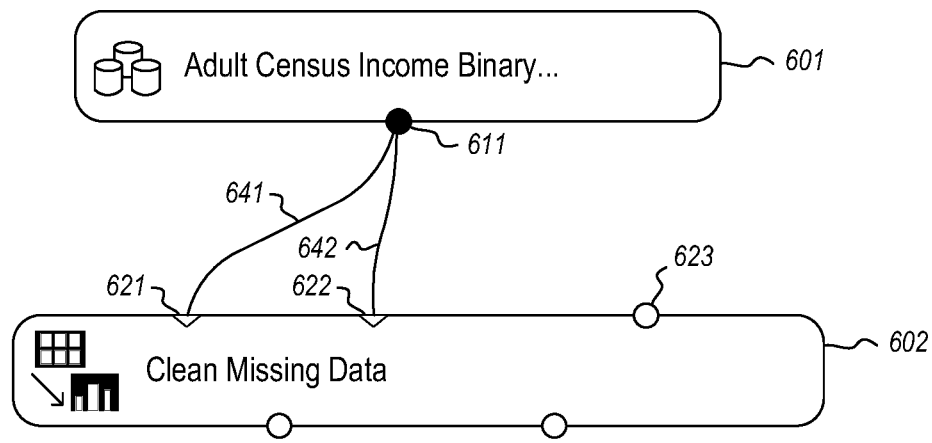
Figure 6C:
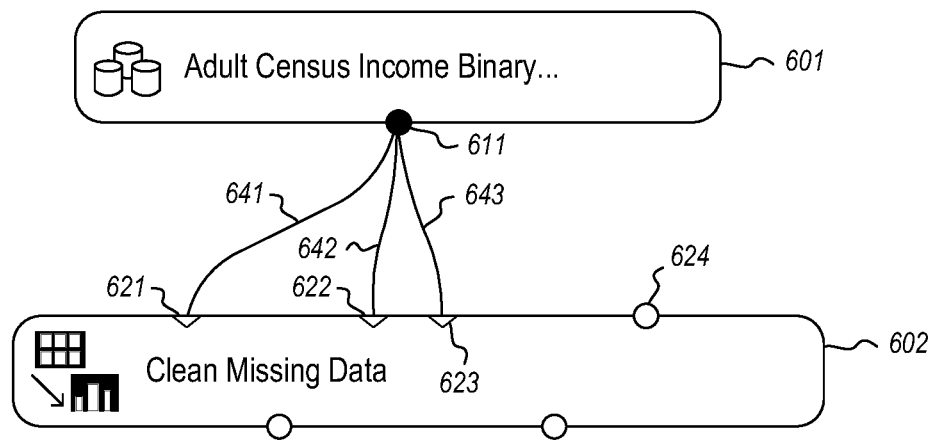

In FIG. 6B, the user has established a connection 642 between the output port 611 of the upstream graph node 601 and the previously available input port 622. Without any further adjustment in the number of input ports of the particular graph node 602, this would result in complete exhaustive use of all of the input ports of the graph node 602, with no remaining available input ports available for other connections to upstream graph nodes. However, in accordance with the principles described herein, a further input port 623 has been automatically added to the particular graph node 602. This resulted from one run of the method 500 of FIG. 5, which is initiated each time a connection is made from an input port of the particular graph node to an upstream graph node.

For instance, when the connection 642 was first made, this triggered the act 501 of FIG. 5, causing the method 500 to be performed. The port adjustment component for the graph node 602 would have then determined whether to add one or more additional input port(s) to the graph node 602 (decision block 502). In the example of FIGS. 6A through 6F, this determination is based on whether the last available input port has just been connected to an upstream graph node. This is true at the point when the connection 642 was first established ("Yes" in decision block 502). Accordingly, an additional input port 623 was added to the particular graph node 602.

Before proceeding further, several variations will now be described. First, in the example of FIG. 6A, the determination (decision block 502) of whether to add input port(s) to the graph node is based on the determination of whether or not the last available input port has just been used by connection to an upstream graph node. However, this need not be the case. The determination (decision block 502) may be that additional input port(s) is/are to be added based on a number of available input ports dropping to a particular threshold due to connections having just been connected to the one or more upstream graph nodes. In this example of FIGS. 6A through 6F, the particular threshold is that there are no available input ports left—all of them have been used up, as a result of the connection(s) just made. However, the particular threshold may be that there is but a single (or any number of) available input port left as a result of the connection just made, or that there is but another number of input ports. The particular threshold may even be configurable, and perhaps also may be dependent on the type of input port (e.g., the purpose of the input port). For instance, perhaps input ports of types that are less frequently used have a threshold of zero (all input ports are used before another is added), whereas input ports of types that are more frequently used have a higher threshold to keep well ahead of things as connections are made.

Another variation is in the number of input port(s) that are added (in act 504) when it is determined that additional input port(s) are to be added ("Yes" in decision block 502). In the example of FIGS. 6A through 6F, only one input port is added at a time (in act 504). However, there may be multiple numbers (e.g., two, three and so forth) of input ports added (in act 504) upon determining that additional input port(s) are to be added ("Yes" in decision block 502). The number again may likewise be configurable and/or depend on the input port type. For instance, if it is anticipated that input ports of a particular type are likely to be used commonly in the future, more input ports may be added again to keep ahead of the curve.

In FIG. 6C, the user again forms another connection 643 this time between the output port 611 of the upstream graph node 601 and the input port 623. Because all available input ports of the graph node are now used ("Yes" in decision block 502), the input port 624 is added automatically (act 504). Once again, the user is not left without an available input port due to the automatic addition of input ports. Note that in FIGS. 6A through 6F, all of the input ports are being connected to a single output port of a single upstream graph node 601. However, the principles described herein are not limited to that. Some, most or all of the input ports of the graph node 602 may be connected to different output ports whether on the same upstream graph node, or whether different upstream graph nodes entirely.

Figure 6D:
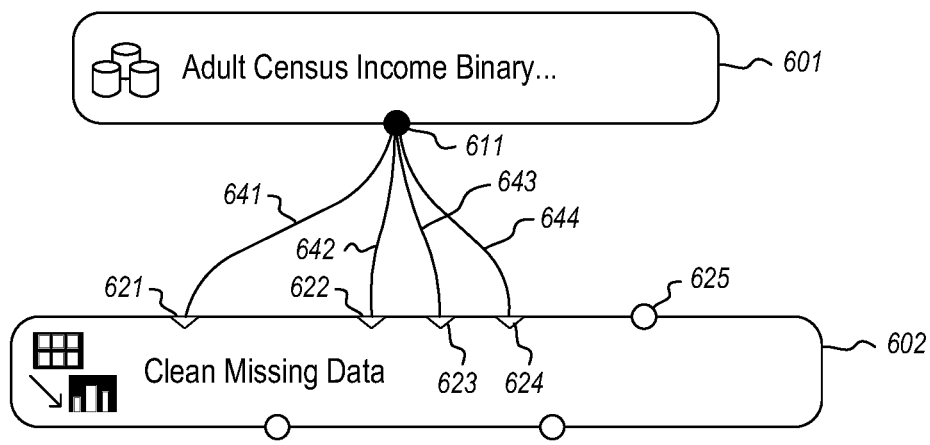
Figure 6E:
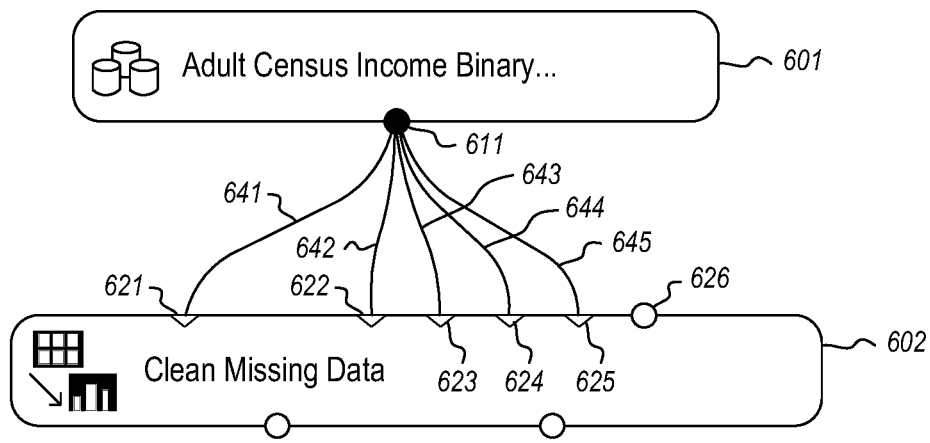

In FIG. 6D, the user forms yet another connection 644 this time between the output port 611 of the upstream graph node 601 and the input port 624. Because all available input ports of the graph node are now used ("Yes" in decision block 502), the input port 625 is added automatically (act 504). In FIG. 6E, the user forms connection 645 between the output port 611 of the upstream graph node 601 and the input port 625, resulting in the input port 626 being automatically added. All the while, the user always has an input port to use without expressly creating it.

Figure 6F:
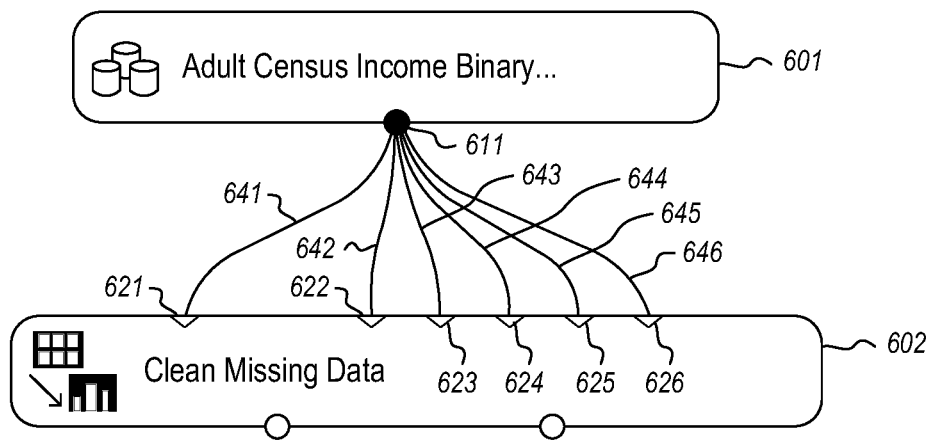

In FIG. 6F, the user forms connection 546 between the output port 611 of the upstream graph node 601 and the input port 626 (act 501). This results in the method 500 being kicked off yet again. However, this time, because the number of input ports has already reached the maximum in this example, it is determined that no further input ports are to be added ("No" in decision block 502). Thus, no further input ports are added (act 503).

Figure 7:
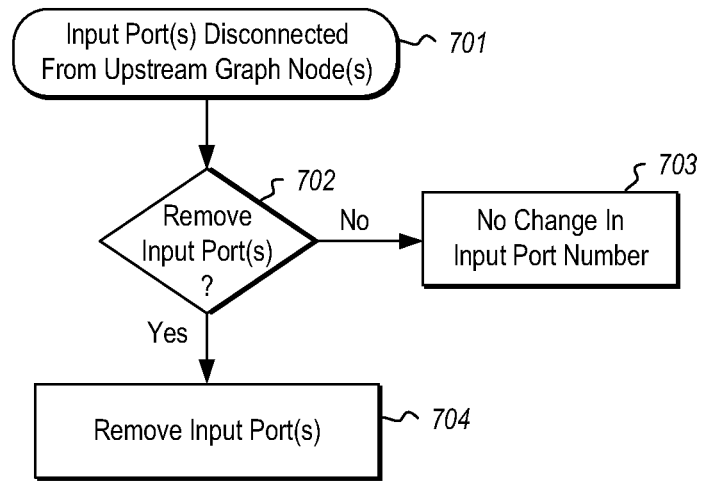
FIG. 7 illustrates a flowchart of a method for removing extra input ports from a graph node in response to detecting the disconnection of input ports of the graph node in accordance with the principles described herein.

FIG. 7 illustrates a flowchart of a method 700 for removing input ports when connections are disconnected. Accordingly, the method 700 is initiated upon detecting that a set of one or more input ports has just be disconnected from one or more upstream graph nodes (act 701). For instance, in FIG. 3, the component 302B notifies (as represented by arrow 312) the port adjustment component 303 of this disconnection. In response, the port adjustment component 303 applies its automated logic to determine whether or not to remove one or more input ports from the graph node (decision block 702). If not ("No" in decision block 702), then no action need be taken in response to the detection (act 703).

On the other hand, if the port adjustment component determines to respond to the detection (act 701) by removing one or more input ports from the graph node ("Yes" in decision block 702), the port adjustment component causes the one or more input ports to be removed from the graph node (act 704). For instance, the port adjustment component 303 may signal (as represented by arrow 322) the graph node visualization module 301 to thereby cause the graph node visualization module 301 to remove visualizations of the input ports from the graph node. Again, from the user's perspective, the user is presented with a clean graph node that does not have an excessive number of distracting unused input ports that deemphasize the importance of the input ports that are actually in use.

Figure 8A:
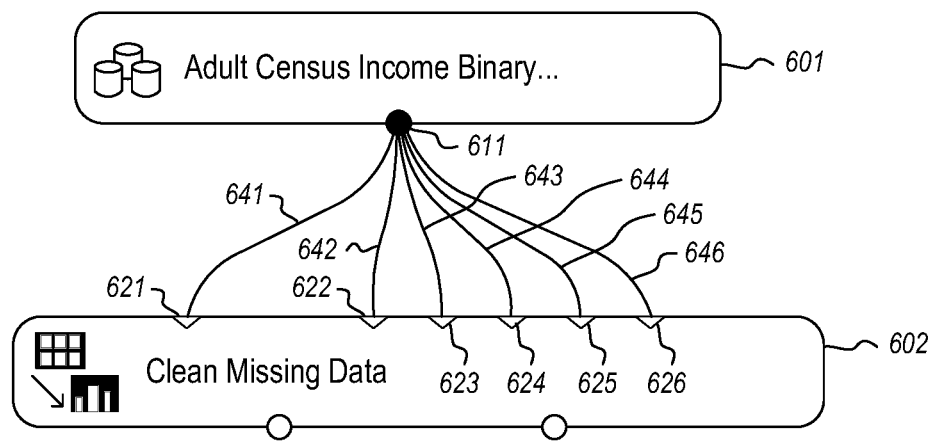
FIGS. 8A through 8G illustrate various stages of a graph node in which multiple input ports are removed in response to multiple performances of the method of FIG. 7.

FIG. 8A through 8G illustrates a graph node in several incremental stages in which input ports are automatically removed. FIG. 8A illustrates the initial stage and is the same as the final stage of the sequence of FIG. 6A through 6F. Accordingly, the stages of FIGS. 8A through 8G can be viewed as continuing the example of FIGS. 6A through 6F. Thus, like elements of FIGS. 8A through 8G share the same numbering as the corresponding elements of FIGS. 6A through 6F.

Again, while there is but a single input port type kind in FIGS. 8A through 8G, the method 700 may be performed independently for each kind of input port type. In such a case, the disconnection of a particular type of input port from a graph node may have no effect whatsoever on whether or not input ports of any other type are to be removed.

Figure 8B:
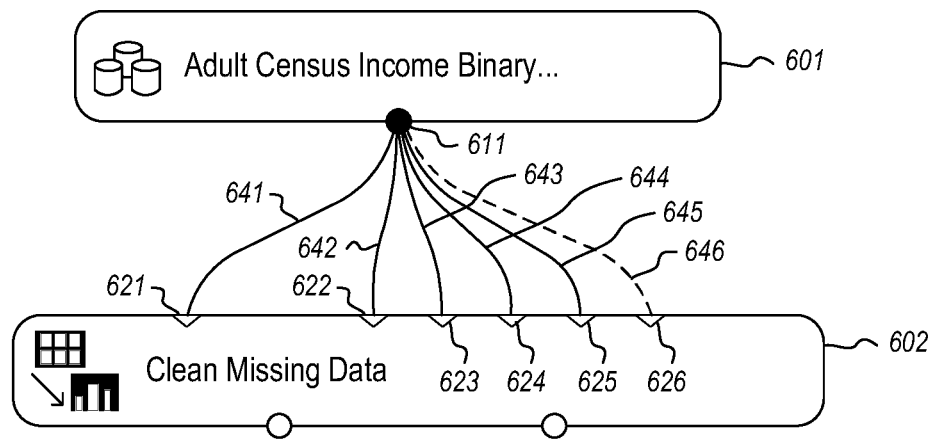
Figure 8C:
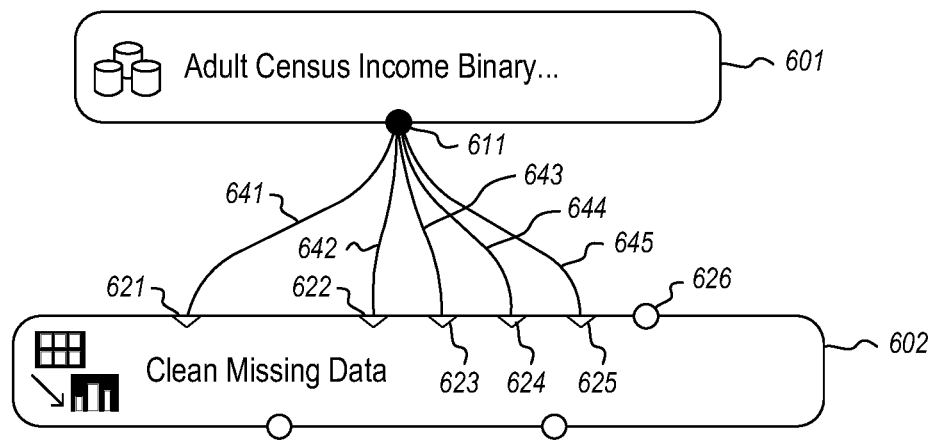
Figure 8D:
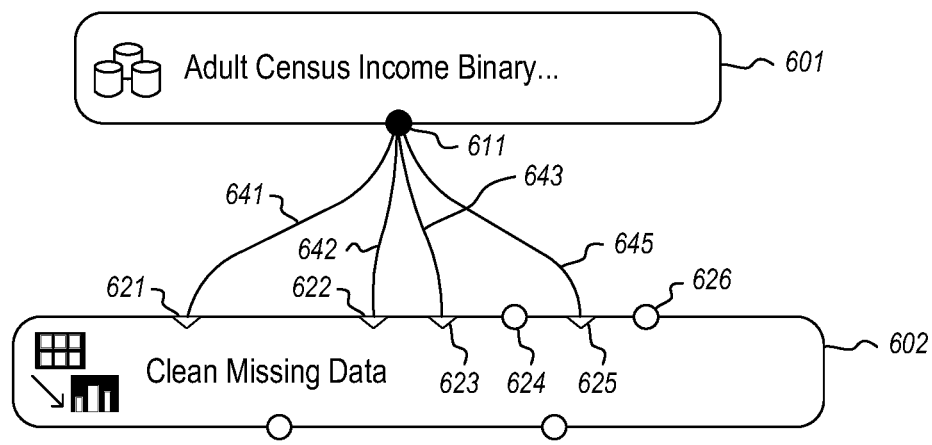

In FIG. 8B, the user has selected connection 646 for elimination, which thereby removes the connection 646 as illustrated in FIG. 8C. This results in input port 626 becoming available, and represents an example of the event 312 of FIG. 3. This also represents an example of the detection of act 701 of FIG. 7, thereby triggering the input port adjustment component executing the method 700 of FIG. 7. Here there is just one extra input port 626.

Before proceeding further, several variations will now be described. First, in the example of FIGS. 8A through 8G, the determination (decision block 702) of whether to remove input port(s) from the graph node is based on the determination of whether or not there would be more than two available input ports due to the disconnection (of act 701) of the input port(s) from upstream graph node(s). However, this need not be the case. The determination (decision block 702) may be that input port(s) is/are to be removed being based on there being a particular number of available input ports due to the disconnection(s). In this example of FIGS. 8A through 8G, the particular number is that there are two available input ports due to the disconnection, resulting in one input port being removed. However, the particular threshold may be any other number, but is preferably such that after performing act 704, there is at least one input port still available in case the user decides to start connecting input ports again. The particular threshold may even be configurable, and perhaps also may be dependent on the type of input port.

Another variation is in the number of input port(s) that are removed (in act 704) when it is determined that the extra input port(s) are to be removed ("Yes" in decision block 702). In the example of FIGS. 8A through 8G, only one input port is removed at a time (in act 704). However, there may be multiple numbers (e.g., two, three and so forth) of input ports removed (in act 704) upon determining that additional input port(s) are to be removed ("Yes" in decision block 702). The number again may likewise be configurable and/or depend on the input port type. Regardless of what the number removed is to be, it is preferably such that after performing act 704, there is at least one input port still available in case the user decides to start connecting input ports again.

Now suppose in FIG. 8C, the user elects to delete connection 644 from input port 624. This results in FIG. 8D in which there are now two available input ports, input port 624 and input port 626, which are not connected to any upstream graph nodes. Here, something different has happened. Here, there is an available input port (namely input port 624) between those input ports that have connections still (namely input ports 621, 622, 623 and 625). After all, available input port 624 is between used input ports 623 and 625. In accordance with one embodiment described herein, in this case, the port adjustment component 303 causes compacting of the connections such that the available input ports are consolidated contiguously at one end of the graph node, and such that the used input ports are consolidated contiguously at the other end of the graph node. Accordingly, the port adjustment component 303 may remove connection 645 and re-establish connection 644. More generally stated, the port adjustment component causes the functionality of the input ports 624 and 625 to be reversed.

Figure 8E:
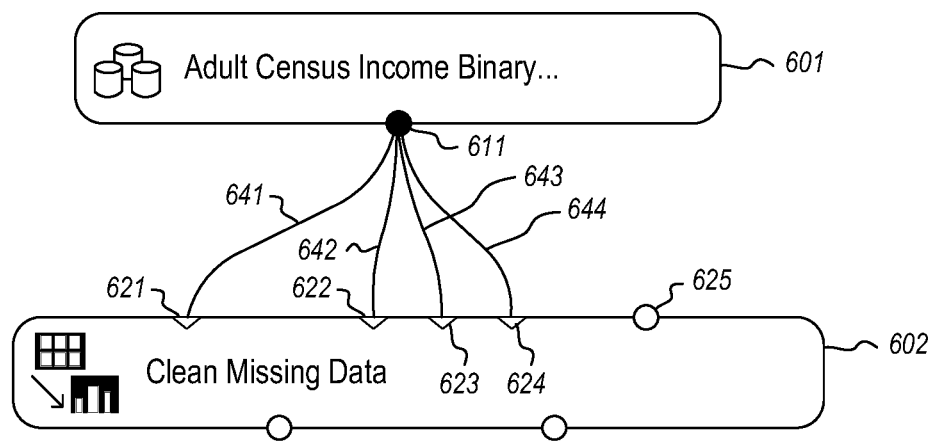

In addition, it is furthermore detected that with the disconnection (and compacting) there are now two extra input ports available (namely, input ports 625 and 626). Accordingly, it is determined that one input port (input port 626) is to be removed ("Yes" in decision block 702). Thus, the input port is removed (act 704). The result would be as illustrated in FIG. 8E. Note that the compacting may occur when adding ports also. For instance, if there were two available input ports to use when adding, and the user decided to connect the most remote input port to an upstream graph node such that there was an available input port now dispersed, the port adjustment component may reverse the function of the newly used input port, and the available input port, so that the used input ports are contiguous. In other words, if upon the new connection being made, it is determined that there are available input ports between a reference spatial point (e.g., the side of the graph node, of the next used input towards towards) and the set of one or more input ports being added, then the connections are collapsed towards the spatial reference point.

Whether compacting results from disconnecting or connecting input ports, such compacting may also consider the input port type. For instance, if there were two input port types, those input ports of the first type might be compacted towards the left side of the graph node, and those input ports of the second type might be compacted towards another spatial reference point (such as a point in the middle of the graph node, or perhaps the right edge of the graph node).

Figure 8F:
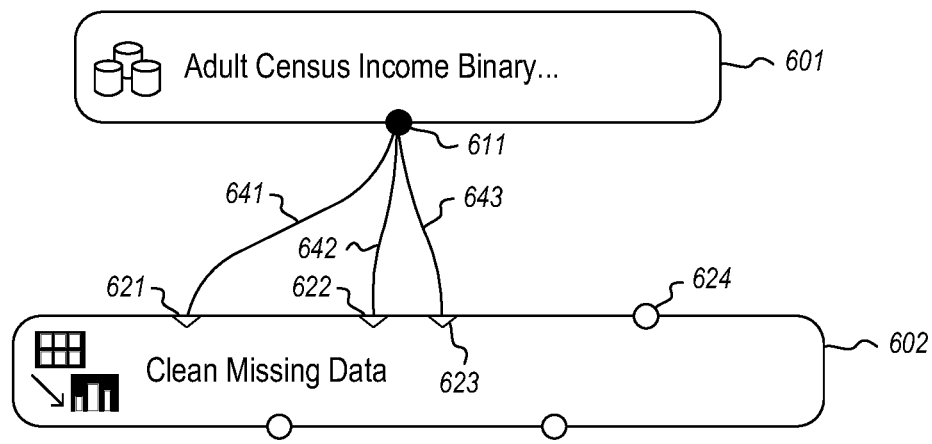
Figure 8G:
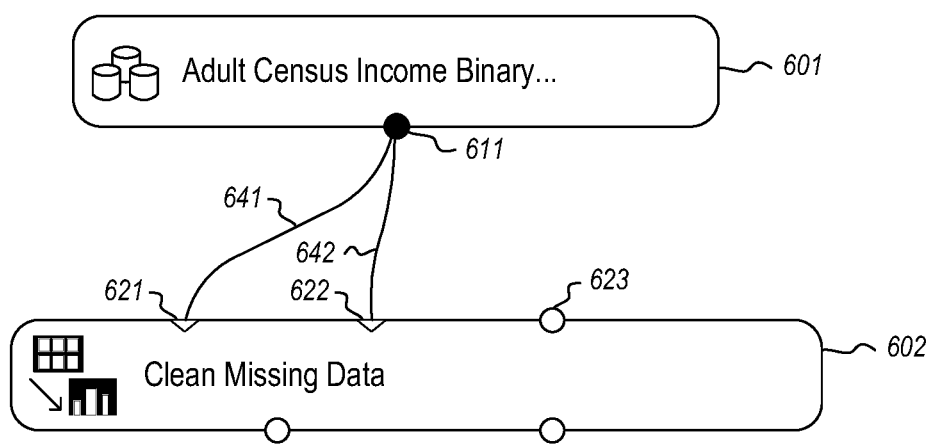

FIG. 8F results if the user were to select to disconnect connection 644 of FIG. 8E. The connection 644 is removed, resulting in two extra input ports 624 and 625. Accordingly, one extra input port 625 is removed. Finally, FIG. 8G results if the user were to select to disconnect connection 643 of FIG. 8F. The connection 643 is removed, resulting in two extra input ports 623 and 624. Accordingly, one extra input port 624 is removed. Finally, if the user were to disconnect connection 643 in FIG. 8G, we would return full circle to FIG. 6A. Connection 642 would be removed resulting in two extra input ports 622 and 623. The input port 623 would thus be removed.

Accordingly, the principles described herein allow for automated addition of input ports as needed, and/or the automated cleanup of extra input ports. Thus, the use is provided with all of the input ports needed, as needed, when formulating the graph node, and is prevented from being distracted by surplus input ports.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of detecting and visualizing changes associated with one or more input ports of a downstream graph node on a graph node visualization, the method comprising:
    identifying a downstream graph node that is represented in a graph node visualization as having a number of one or more input ports;
    detecting user input for connecting a particular input port of the one or more the input ports of the downstream graph node to an output port of an upstream graph node;
    visually representing the downstream graph node on the graph node visualization as being connected to the upstream graph node with a visual connection being displayed between the particular input port of the downstream graph node and the output port of the upstream graph node;
    automatically adding a new input port to the downstream graph node within the graph node visualization in response to the particular input port of the downstream graph node being connected to the output port of the upstream graph node.

2. The method of claim 1, wherein the particular input port is a last available input port of the downstream graph node that is not connected to one or more corresponding output ports.

3. The method of claim 1, wherein prior to adding the new input port to the downstream graph node, the method further includes making a determination that the downstream graph node does not yet have a maximum quantity of input nodes displayed in the graph node visualization.

4. The method of claim 1, wherein the adding of the new input port to the downstream graph node includes adding a plurality of new input ports to the downstream graph node at the same time.

5. The method of claim 1, wherein the particular input port is visualized in the graph node visualization with an input port color that represents a particular corresponding an input port type and that is distinguished from at least one other input port color used to represent at least one other input port type.

6. The method of claim 1, wherein the particular input port is visualized in the graph node visualization with an input port size that represents a particular corresponding an input port type and that is distinguished from at least one other input port size used to represent at least one other input port type.

7. The method of claim 1, wherein the particular input port is visualized in the graph node visualization with an input port shape that represents a particular corresponding an input port type and that is distinguished from at least one other input port shape used to represent at least one other input port type.

8. The method of claim 1, wherein the particular input port is visualized in the graph node visualization with a particular color, shape and/or size that corresponds to a type of data and that is distinguished from an alternative corresponding color, shape and/or size associated with visualizing input or output ports corresponding to a different type of data.

9. The method of claim 8, wherein the particular color, shape and/or size is a same corresponding color, shape and/or size used to visualize the output port of the upstream graph node.

10. The method of claim 1, wherein automatically adding a new input port to the downstream graph node within the graph node visualization is further based on a type and/or quantity of new input port(s) anticipated to be utilized in the future.

11. A method of detecting and visualizing changes associated with one or more input ports of a downstream graph node on a graph node visualization, the method comprising:
    identifying a downstream graph node that is represented in a graph node visualization as having a number of one or more input ports connected to one or more output ports of one or more upstream graph nodes;
    detecting input disconnecting a visualized connection in the graph node visualization between particular input port of the one or more the input ports of the downstream graph node from an output port of an upstream graph node;
    removing the visualized connection in the graph node visualization in response to the input; and
    determining whether to remove the input port of the downstream graph node from the graph node visualization after it is no longer connected to the output port of the upstream graph node, wherein the determination whether to remove the input port is based on determining whether there are a minimum quantity of available input ports visualized within the graph node visualization that are available to be connected with the one or more output ports of the one or more upstream graph nodes.

12. The method of claim 11, wherein the method further includes:
    making a determination that the minimum quantity of available input ports visualized in the graph node visualization exceeds the minimum quantity of available input ports; and
    removing the input port of the downstream graph node from the graph node visualization.

13. The method of claim 12, wherein the method further includes moving at least one other visualized connection in the graph node visualization and/or moving the visualized input port in the graph node visualization in response to removing the visualized connection between the input port and the output port so as to compact other visualized connections in the graph node visualization, and which includes the at least one other connection, so as to visualize the other visualized connections in a contiguous arrangement with no unconnected input ports interposed between the contiguous arrangement of the visualized connections.

14. The method of claim 12, wherein the input port is removed concurrently with removal of an additional input port, based on the determination that the minimum quantity of available input ports visualized in the graph node visualization, including the input port and the additional input port, collectively exceeds the minimum quantity of available input ports and that removal of the input port and the additional input port will still result in the minimum quantity of available input ports being visualized at the graph node visualization.

15. The method of claim 11, wherein the input port is visualized in the graph node visualization with a particular color, shape and/or size that corresponds to a type of data and that is distinguished from an alternative corresponding color, shape and/or size associated with visualizing input or output ports corresponding to a different type of data.

16. A computing system connected to a display comprising:
   one or more processors; and
   one or more storage medium having stored computer executable instructions which are operable, when executed by the one or more processors to configure the computing system to perform the following:
      visualize a downstream graph node on the display as having a number of input ports;
      detect that a set of one or more input ports of the downstream graph node has just been disconnected from one or more output ports of one or more upstream graph nodes;
      determine that one or more particular input ports are to be removed from the graph node in response to determining that the number of input ports include a quantity of available input ports that are not visualized as being connected exceed a minimum quantity of available input ports; and
      automatically in response to the determining, remove the determined one or more particular input ports from the graph node, while ensuring that the quantity of available input ports continues to remain displayed on the graph node after the act of removing.

17. The system of claim 16, wherein the minimum quantity of available input ports is one.

18. The system of claim 16, wherein the minimum quantity of available input ports is greater than one.

19. The system of claim 16, wherein the computer-executable instructions are further executable by the one or more processors for configuring the computing system to further perform the following:
   detect user input for connecting a particular input port of the one or more the input ports to an output port of an upstream graph node;
   visualize the downstream graph node as being connected to the upstream graph node with a visual connection being displayed between the particular input port of the downstream graph node and the output port of the upstream graph node; and
   automatically add a new input port to the downstream graph node within the graph node visualization in response to the particular input port of the downstream graph node being connected to the output port of the upstream graph node.

20. The system of claim 19, wherein the particular input port is visualized in the graph node visualization with a particular color, shape and/or size that corresponds to a type of data and that is distinguished from an alternative corresponding color, shape and/or size associated with visualizing input or output ports corresponding to a different type of data.

* * * * *